(12) United States Patent
Yang et al.

(10) Patent No.: US 10,367,849 B2
(45) Date of Patent: Jul. 30, 2019

(54) METHOD AND SYSTEM FOR DETECTING PHISHING PAGE

(71) Applicant: Baidu Online Network Technology (Beijing) Co., Ltd., Beijing (CN)

(72) Inventors: Nian Yang, Beijing (CN); Zhifeng Geng, Beijing (CN); Xiaodong Su, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/533,925

(22) PCT Filed: Dec. 30, 2015

(86) PCT No.: PCT/CN2015/099898
§ 371 (c)(1),
(2) Date: Jun. 7, 2017

(87) PCT Pub. No.: WO2017/036043
PCT Pub. Date: Mar. 9, 2017

(65) Prior Publication Data
US 2018/0205758 A1      Jul. 19, 2018

(30) Foreign Application Priority Data

Aug. 28, 2015 (CN) .......................... 2015 1 0542777

(51) Int. Cl.
*H04L 29/06* (2006.01)
*G06F 16/954* (2019.01)

(52) U.S. Cl.
CPC ........ *H04L 63/1483* (2013.01); *G06F 16/954* (2019.01); *H04L 29/06* (2013.01); *H04L 63/1425* (2013.01)

(58) Field of Classification Search
CPC .......................... H04L 63/1483; H04L 29/06
(Continued)

(56) References Cited

U.S. PATENT DOCUMENTS 8,839,369 B1   9/2014   Dai
9,130,986 B2   9/2015   Troyansky
(Continued)

FOREIGN PATENT DOCUMENTS

CN   101978376 A   2/2011
CN   103516693 A   1/2014
(Continued)

OTHER PUBLICATIONS

Kim, S-H et al., "Geo-Location based QR-Code Authentication Scheme to Defeat Active Real-Time Phishing Attack," Association for Computing Machinery, Nov. 2013, pp. 51-61 (11 pages).
(Continued)

*Primary Examiner* — Anthony D Brown
(74) *Attorney, Agent, or Firm* — Nixon Peabody LLP

(57) ABSTRACT

The present disclosure provides a method and system for detecting a phishing page. The method comprises: intercepting user data attempted to be submitted by a current page to a server; constructing detection data having a structure identical to a structure of the user data, content of the detection data being different from content of the user data; submitting the detection data to the server; and determining whether the current page is a phishing page based on a response from the server. By using the method and the system for detecting a phishing page provided in the present disclosure, a user can immediately and accurately determine whether the current page is a phishing page, thereby protecting privacies and assets better.

17 Claims, 7 Drawing Sheets

(58) Field of Classification Search
USPC .................................................... 726/22–25
See application file for complete search history.

(56) References Cited

U.S. PATENT DOCUMENTS

| | | |
|---|---|---|
| 2007/0192853 A1 | 8/2007 | Shraim et al. |
| 2008/0244715 A1 | 10/2008 | Pedone |
| 2008/0307529 A1 | 12/2008 | Choi et al. |
| 2014/0041024 A1 | 2/2014 | Larkins |
| 2015/0319191 A1* | 11/2015 | Georgiev ............ H04L 61/1511 |
| | | 726/23 |
| 2015/0365433 A1* | 12/2015 | Klein .................... G06F 21/552 |
| | | 726/23 |

FOREIGN PATENT DOCUMENTS

| | | |
|---|---|---|
| CN | 105141610 A | 12/2015 |
| JP | 2007-334759 A | 12/2007 |
| JP | 2011-154413 A | 8/2011 |

OTHER PUBLICATIONS

International Search Report corresponding to International Patent Application No. PCT/CN2015/099898, State Intellectual Property Office of the P.R. China, dated May 19, 2016; (2 pages).

\* cited by examiner

METHOD AND SYSTEM FOR DETECTING PHISHING PAGE

CROSS-REFERENCE TO RELATED APPLICATION

This patent application is a U.S. National Stage of International Application No. PCT/CN2015/099898, filed Dec. 30, 2015, which claims the benefit and priority of Chinese Patent Application No. 201510542777.5, filed on Aug. 28, 2015, the entire contents of which are hereby incorporated herein in their entireties by reference.

TECHNICAL FIELD

The present disclosure relates to an Internet page, and specifically to a method and a system for detecting a phishing page.

BACKGROUND

With the explosive growth of Internet data, there is a growing number of phishing websites stealing private information such as users submitted bank account numbers and passwords. Phishing website pages are identical to interfaces of true websites. One kind of fraud may include asking visitors to submit privacy information such as bank account numbers and passwords by attracting users with information of winning a lottery. Another kind of fraud is to defraud bank card information or Alipay account numbers of users by simulating online payment pages such as Taobao and ICBC. Frequent appearance of the phishing websites causes great damage to privacy and asset securities of network users. However, existing methods for detecting a phishing page have the disadvantages of short effective time and narrow usable range, and thus cannot effectively guarantee the security of network environment for the users.

SUMMARY

In view of the above disadvantages or defects in the prior art, it is expected to provide a solution for more effectively and accurately detecting a phishing page. For the aforementioned one or more objectives, the present disclosure provides a method and system for detecting a phishing page based on feedback of detection data.

According to one aspect of the present disclosure, a method for detecting a phishing page is provided, comprising: intercepting user data attempted to be submitted by a current page to a server; constructing detection data having a structure identical to a structure of the user data, content of the detection data being different from content of the user data; submitting the detection data to the server; and determining whether the current page is a phishing page based on a response from the server.

In an embodiment of the present disclosure, the determining whether the current page is a phishing page based on a response from the server comprises: determining that the response from the server is a success in authenticating the detection data; and determining that the current page is a phishing page.

In an embodiment of the present disclosure, the determining whether the current page is a phishing page based on a response from the server comprises: determining that the response from the server is a failure in authenticating the detection data; constructing second detection data having a structure identical to the structure of the user data but having content different from the content of the user data and the content of the detection data; submitting the second detection data to the server; and determining that the current page is a phishing page when the response from the server is a success in authenticating the second detection data.

In an embodiment of the present disclosure, the method further comprises: determining that the current page is a suspected phishing page; and intercepting the user data attempted by the current page to submit to the server when determining that the current page is the suspected phishing page.

In an embodiment of the present disclosure, the determining that the current page is a suspected phishing page comprises: determining that the user data attempted by the current page to submit to the server is a plaintext.

In an embodiment of the present disclosure, the determining that the current page is a suspected phishing page comprises: determining a web address of an official website of the current page based on a content of the current page; and determining that the current page is a suspected phishing page when determining that a web address of the current page is inconsistent with the determined web address of the official website.

In an embodiment of the present disclosure, the user data comprise a username and a password.

In an embodiment of the present disclosure, the method further comprises: displaying the official website to a user based on the determining that the current page is a phishing page.

In an embodiment of the present disclosure, the method further comprises: providing a user with a risk warning based on the determining the current page being a phishing page;
receiving a feedback on the risk warning from the user; generating a phishing website database based on the feedback; and determining whether the current page is a phishing website by using the phishing website database, before the intercepting user data attempted by the current page to submit to a server.

According to another aspect of the present disclosure, a system for detecting a phishing page is provided, comprising: an intercepting device, configured to intercept user data attempted to be submitted by a current page to a server; a detection data constructing device, configured to construct detection data having a structure identical to a structure of the user data, content of the detection data being different from content of the user data; a submitting device, configured to submit the detection data to the server; and a determining device, configured to determine whether the current page is a phishing page based on a response from the server.

By using the method and the system for detecting a phishing page provided by the present disclosure, it is determined whether the current page is a phishing page by intercepting and replacing user data submitted by a client to a server and by determining a response from the server. In this way, accurately and immediately detecting a phishing page can be achieved, thereby providing a safe network environment for the user, and thus effectively protecting privacies and assets of the user.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
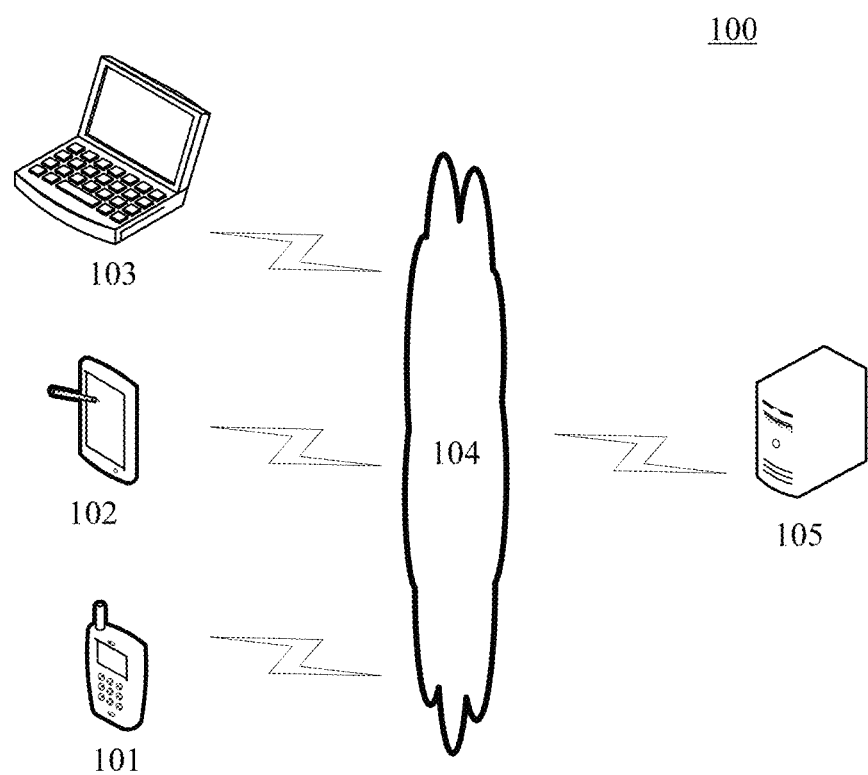
FIG. 1 is an exemplary architecture diagram of a system to which the method or system for detecting a phishing page according to the present disclosure may be applied.

FIG. 1 is an exemplary architecture diagram of a system 100 to which the method or system for detecting a phishing page according to the present disclosure may be applied.

As shown in FIG. 1, the system architecture 100 may include client devices 101, 102 and 103, a network 104 and a server 105. The network 104 serves as a medium providing a communication link between the client devices 101, 102 and 103 and the server 105. The network 104 may include various types of connections, such as wired or wireless communication links, or optical fibers.

The user may use the client devices 101, 102 and 103 to interact with the server 105 through the network 104, in order to transmit or receive messages, etc. Various webpage browsers and client applications may be installed on the client devices 101, 102 and 103.

The client devices 101, 102, and 103 may be various electronic devices, including but not limited to, a smart phone, a tablet computer, a laptop portable computer, a desktop computer, and the like.

The server 105 may be a server providing various services, for example, for login on a webpage or an application, a bank account and payment operations.

It should be appreciated that the numbers of the client devices, the network and the server in FIG. 1 are merely illustrative. Any number of client devices, networks and servers may be provided based on the actual requirements.

It should be noted that the method for detecting a phishing page according to the embodiments of the present application may be executed by the client devices 101, 102, or 103 separately or by the client devices 101, 102, and 103 and the server 105 together. Accordingly, the system for detecting a phishing page is generally set in the client devices 101, 102, and 103.

Figure 2:
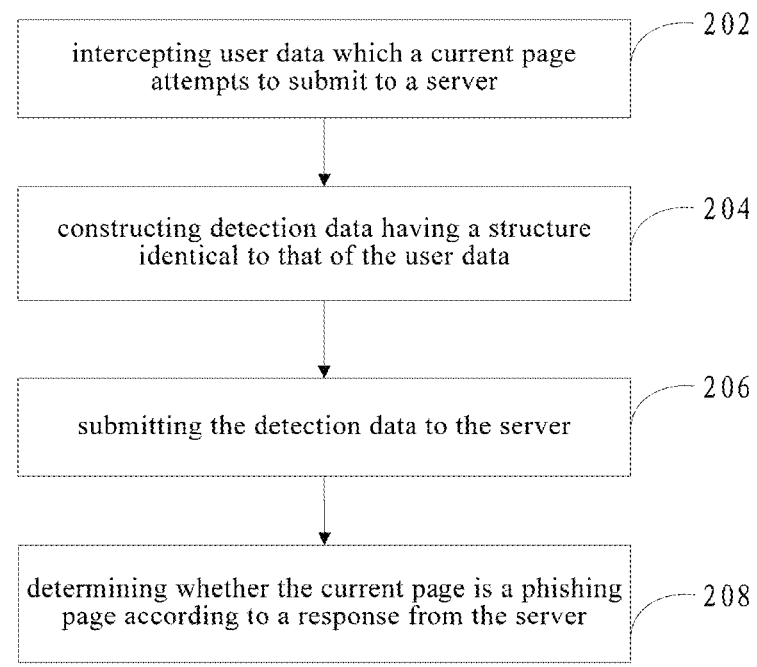
FIG. 2 illustrates a method for detecting a phishing page according to an embodiment of the present disclosure.

Referring to FIG. 2, which illustrates a method 200 for detecting a phishing page according to an embodiment of the present disclosure.

As shown in FIG. 2, in Step 202, user data attempted to be submitted by a current page to a server is intercepted. In Step 204, detection data having a structure identical to a structure of the user data is constructed. The content of the detection data is different from content of the user data. In Step 206, the detection data is submitted to the server. In Step 208, it is determined whether the current page is a phishing page based on a response from the server.

According to an embodiment of the present disclosure, the user data may comprise various fields related to the user, for example, including but not limited to: a username, a registered e-mail box, a mobile phone number, a passphrase such as a password and a login verification code.

Figure 3:
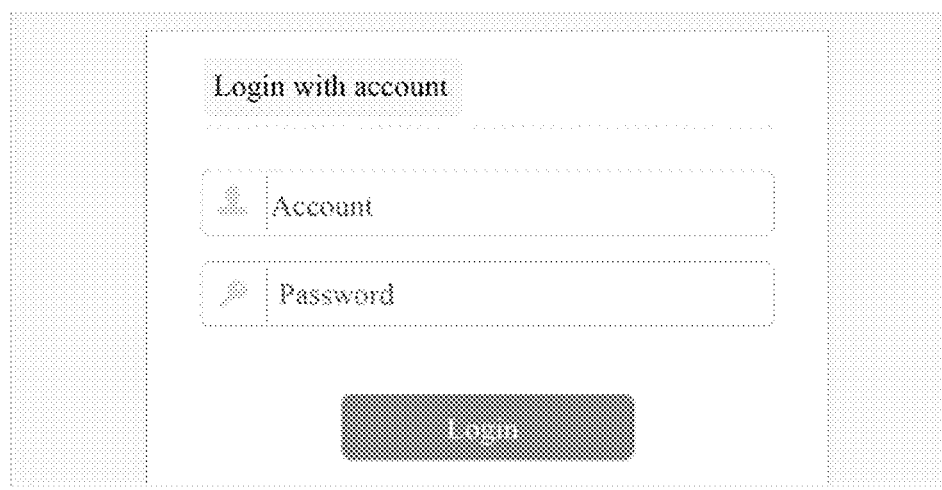
FIG. 3 illustrates a phishing page.

For example, FIG. 3 exemplarily illustrates a schematic diagram of a phishing page, wherein the login page comprises fields of "Account Number" and "Password". Therefore, the user data in the embodiment as shown in FIG. 3 comprise two fields, namely, an account number and a password.

Taking FIG. 3 as an example, when the user fills in the username field and the password field and clicks "Login", an operation of submitting a data packet to the server may be triggered. Generally, the user data are submitted to the server by using a POST action. The POST action may include, for example, constructing data based on the content filled in by the user and submitting the constructed data to the server using, for example, an HTTP protocol.

In Step 202, an electronic device (for example, the clients 101, 102 and 103 in FIG. 1) conducts the operation of submitting a data packet to the server, for example, the POST action being intercepted. Next, in Step 204, the electronic device (for example, the clients 101, 102 and 103 in FIG. 1) constructs detection data identical in structure but different in content from the intercepted user data.

Taking FIG. 3 as an example, the detection data identical in username but different in password from the user data may be constructed, or the detection data different in username and password from the user data may be constructed.

To prevent the constructed detection data from seeing through by a phishing website, the length of each field of the constructed detection data may respectively correspond to that of each filed of the user data. In Step 206, the electronic device (for example, the clients 101, 102 and 103 in FIG. 1) submits the constructed detection data to the server (such as the server 105 in FIG. 1) by using, for example, a POST method.

In Step 208, the electronic device (for example, the clients 101, 102 and 103 in FIG. 1) determines whether the current page is a phishing page based on a response of the server (such as the server 105 in FIG. 1). Determining corresponding phishing pages based on different responses of the server will be specifically discussed hereinafter.

Case I: the response of the server is a success in authenticating the detection data.

Figure 4:
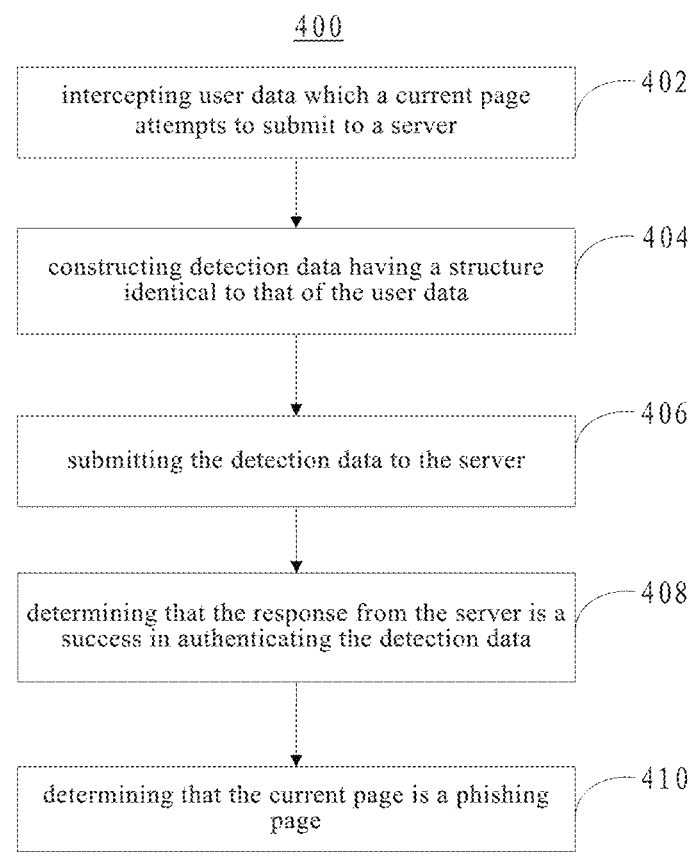
FIG. 4 illustrates a method for detecting a phishing page according to an embodiment of the present disclosure.

FIG. 4 illustrates a method 400 for detecting a phishing page according to an embodiment of the present disclosure. As shown in FIG. 4, Steps 402-406 of the method 400 are the same as Steps 202-206 of the method 200, and thus are not repeated herein. In Step 408, it is determined that the response from the server is a success in authenticating the detection data; and in Step 410, it is determined that the current page is a phishing page.

For example, the response of the server succeeding in authenticating the detection data may be texts such as "Login succeeded" or "De-encapsulation succeeded" displayed on the page. Since the detection data comprise each field counterfeited based on the user data, certainly the detection data fail in authentication for the official website. Therefore, the current page may be determined as the phishing page at this point.

Case II: the response of the server is a failure in authenticating the detection data.

Some phishing pages may induce the user for a secondary input by prompting information error after the user enters the account number information and the password. This prompt may cause the user to check the entered information, thereby enhancing a success rate of phishing. Therefore, the present disclosure proposes a method for detecting a page for the second time.

Figure 5:
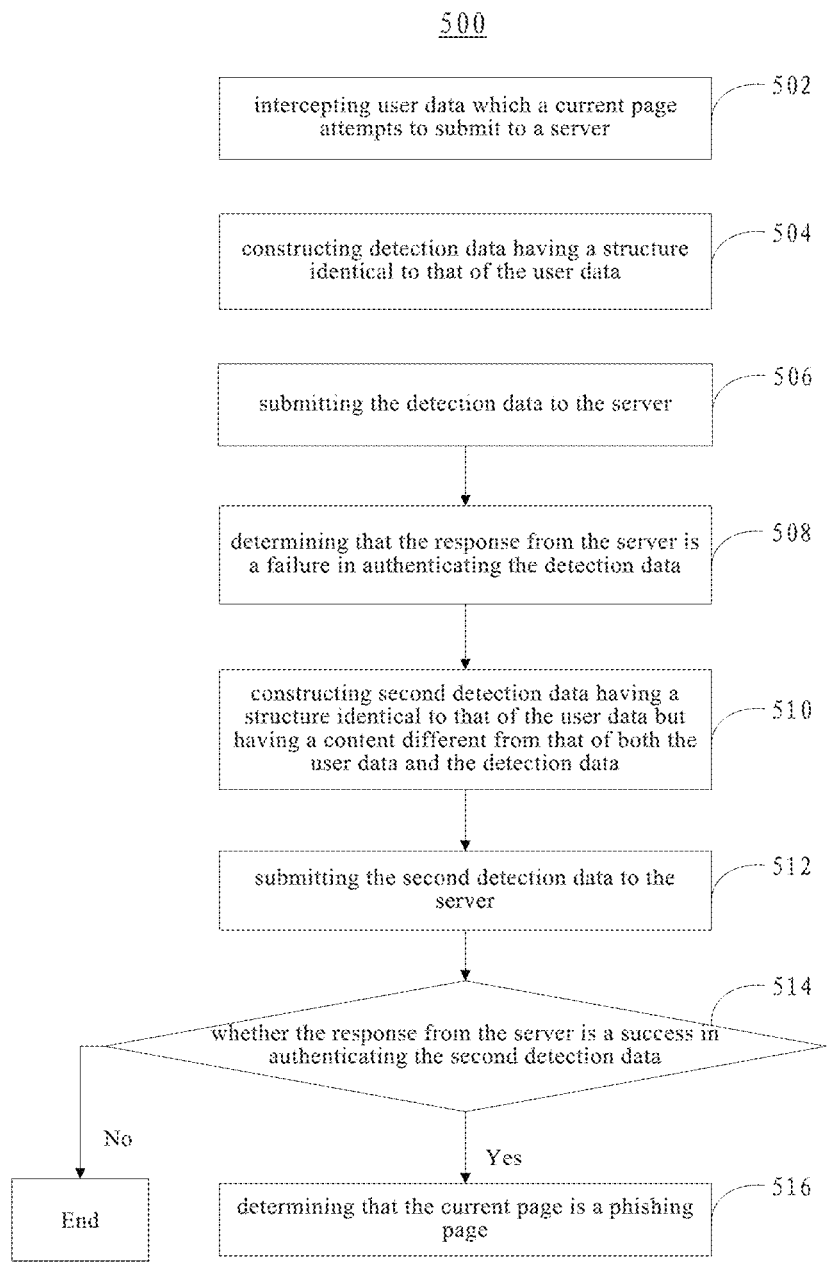
FIG. 5 illustrates a method for detecting a phishing page according to an embodiment of the present disclosure.

FIG. 5 illustrates a method 500 for detecting a phishing page based on an implementation of the present disclosure. As shown in FIG. 5, Steps 502-506 of the method 500 are the same as Steps 202-206 of the method 200, and thus are not repeated herein. In Step 508, it is determined that the response from the server is a failure in authenticating the detection data. In Step 510, second detection data having a structure identical to that of the user data but having content different from that of both the user data and the detection data is constructed. In Step 512, the second detection data is submitted to the server. In Step 514, it is determined whether the response from the server is a success in authenticating the second detection data. In Step 516, the current page is determined as a phishing page based on the determination result of Step 514 being "yes".

To further guarantee the safety of the network environment, multiple detections such as a third detection or a fourth detection may be further performed in a similar method.

In practical application, to avoid inconvenience caused to the user by a phishing page detection for each login, before detecting whether the current page is a phishing page, it is determined in advance whether the current page is a suspected phishing page, and the above methods 200, 400 and 500 are not performed unless the current page is the suspected phishing page.

Figure 6:
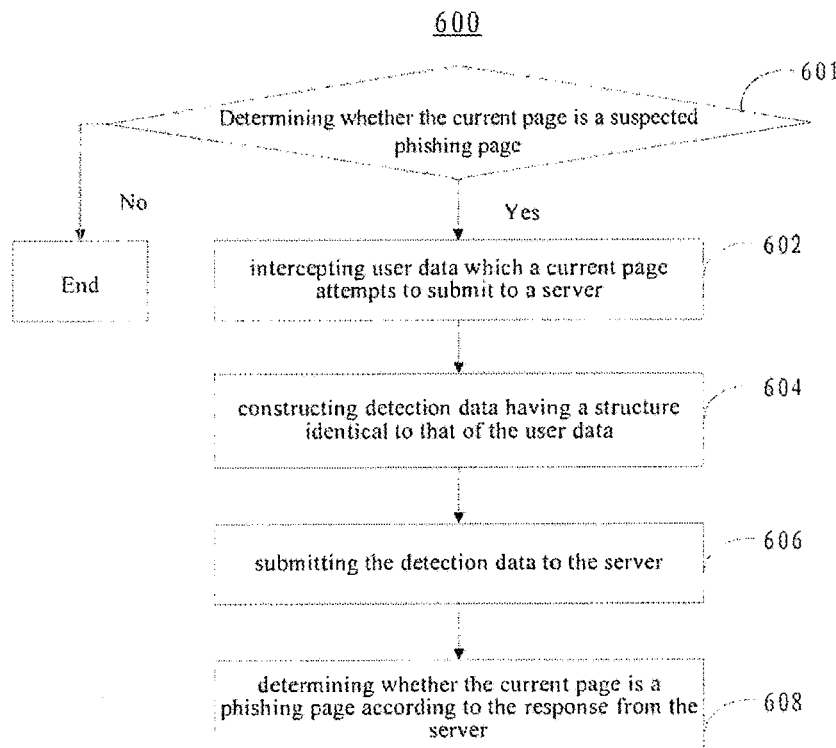
FIG. 6 illustrates a method for detecting a phishing page according to an embodiment of the present disclosure.

FIG. 6 illustrates a method 600 for detecting a phishing page based on an implementation of the present disclosure. As shown in FIG. 6, Steps 602-606 of the method 600 are the same as Steps 202-206 of the method 200, and thus are not repeated herein. Before Step 602, the method 600 further comprises Step 601: determining whether the current page is a suspected phishing page.

According to an embodiment of the present disclosure, the determining whether the current page is a suspected phishing page may be performed by determining whether the user data attempted by the current page to submit to the server is a plaintext. When the user data attempted by the current page to submit to the server is a plaintext, that is, when data of the user monitored in a browser is consistent with data of POST, the current page may be determined as the suspected phishing page.

According to an embodiment of the present disclosure, the determining that the current page is a suspected phishing page also may be performed by following steps: determining a web address of an official website of the current page based on content of the current page; and determining that the current page is a suspected phishing page when determining that a web address of the current page is inconsistent with the determined web address of the official website.

In addition, also it may be first determined whether the current page is a login page. For example, a page is determined as a login page when it is found that a page title contains word "XX login", or "value" of an "input" tag in a webpage structure is set as words such as "account number" and "password" or a page contains a button "Login".

Next, for example, when the content displayed on the current page includes the content related to a "QQ mailbox", the web address of the current page may be compared with the official website of the QQ mailbox. The current page is determined as the suspected phishing page when the comparison result shows a discrepancy.

According to an embodiment of the present disclosure, the method may further comprise: displaying the official website to a user based on the determining that the current page is a phishing page. For example, when the current page of the user is a phishing website counterfeiting an electronic bank of a certain industrial and commercial bank, the official website of the certain industrial and commercial bank may be displayed to the user after the current page is determined as the phishing page using the method 200, 400, 500 or 600.

Figure 7:
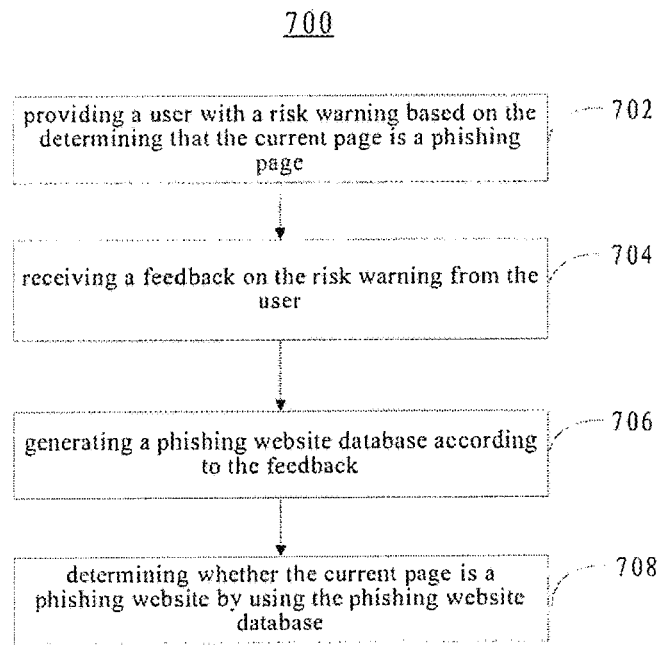
FIG. 7 illustrates a method for detecting a phishing page according to an embodiment of the present disclosure.

FIG. 7 illustrates a method 700 for detecting a phishing page according to an embodiment of the present disclosure, comprising: Step 702: providing a user with a risk warning based on the determining that the current page is a phishing page; Step 704: receiving a feedback on the risk warning from the user; Step 706: generating a phishing website database based on the feedback; and Step 708: determining whether the current page is a phishing website by using the phishing website database, before the intercepting user data attempted by a current page to submit to a server.

For example, each feedback from each user may be uploaded to a cloud, and a contrastive analysis is made on these feedbacks to form pages determined as phishing pages into the phishing website database. In the next phishing page detection, the current page may be first compared with the phishing website database, and the current page is directly determined as a phishing page when there is a matching record. On the contrary, the various aforementioned methods are performed when the current page is absent from the phishing website database. When the current page is determined as the phishing page in the following method, the user feeds back and uploads the web address of the current page to the cloud, so that the current page determined as the phishing page is added into the phishing website database.

Figure 8:
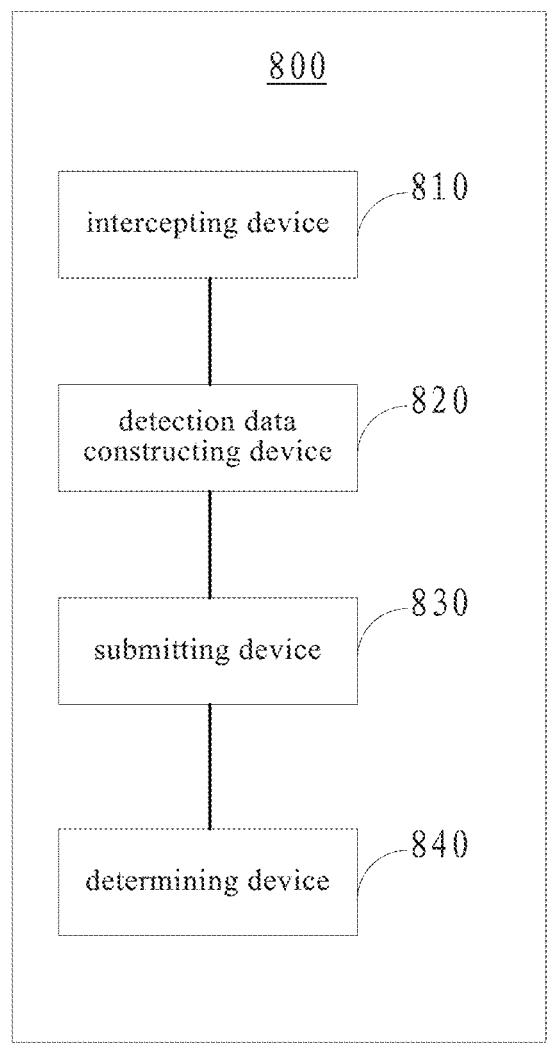
FIG. 8 schematically illustrates a block diagram of a system for detecting a phishing page according to the present disclosure.

Referring to FIG. 8, as an implementation of the method as shown in the foregoing figures, the present disclosure provides an embodiment of a system for detecting a phishing page. The apparatus embodiment corresponds to the method embodiment as shown in FIG. 2, and the apparatus of the system 800 may be specifically used in various electronic devices.

Those skilled in the art may understand that the system 800 for detecting a phishing page further comprises some other known structures such as a processor or a memory. These known structures are not shown in FIG. 8 in order to not unnecessarily obscure the embodiments of the present disclosure.

As shown in FIG. 8, the system 800 may comprise: an intercepting device, configured to intercept user data attempted by a current page to submit to a server; a detection data constructing device, configured to construct detection data having a structure identical to that of the user data, content of the detection data being different from that of the user data; a submitting device, configured to submit the detection data to the server; and a determining device, configured to determine whether the current page is a phishing page based on a response from the server. Specific operations of the intercepting device 810, the detection data constructing device 820, the submitting device 830 and the determining device 840 are the same as Steps 202-208 of the method 200, and thus a detailed description thereof is omitted.

In addition, based on an implementation of the present disclosure, the intercepting device 810, the detection data constructing device 820, the submitting device 830 and the determining device 840 may be positioned at the client, for example, embedded as plugins into the browser of the user, or installed as firewall software into a computer of a client.

According to an embodiment of the present disclosure, the system 800 for detecting a phishing page may further comprise an official website displaying device, configured to display the official website to a user based on the determining that the current page is the phishing page.

According to an embodiment of the present disclosure, the system 800 for detecting a phishing page may further comprise a phishing website database generating device, configured to: provide a user with a risk warning based on the determining that the current page is a phishing page; receive a feedback on the risk warning from the user; generate a phishing website database based on the feedback; and determine whether the current page is a phishing website by using the phishing website database, before the intercepting user data attempted by the current page to submit to a server.

The phishing website database generating device correspond to the method 700 as described above, and thus is not described herein again.

Figure 9:
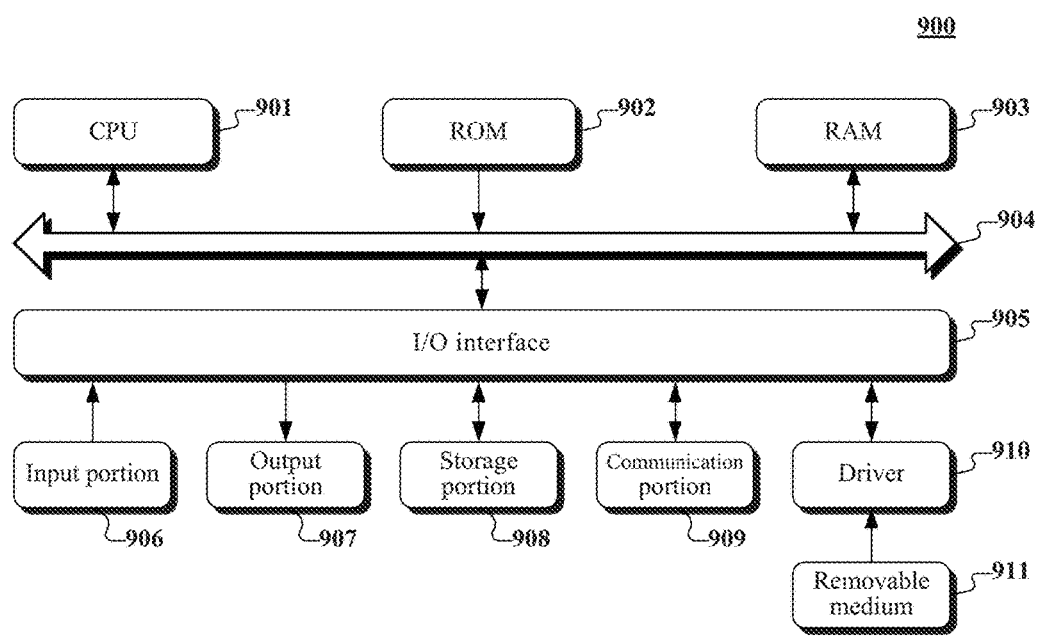
FIG. 9 illustrates a structural schematic diagram of a computer system adapted to implement a terminal or server of the embodiments of the present disclosure.

Referring to FIG. 9, a schematic structural diagram of a computer system 900 adapted to implement a server of the embodiments of the present disclosure is shown.

As shown in FIG. 9, the computer system 900 includes a central processing unit (CPU) 901, which may execute various appropriate actions and processes in accordance with a program stored in a read-only memory (ROM) 902 or a program loaded into a random access memory (RAM) 903 from a storage portion 908. The RAM 903 also stores various programs and data required by operations of the system 900. The CPU 901, the ROM 902 and the RAM 903 are connected to each other through a bus 904. An input/output (I/O) interface 905 is also connected to the bus 904.

The following components are connected to the I/O interface 905: an input portion 906 including a keyboard, a mouse etc.; an output portion 907 comprising a cathode ray tube (CRT), a liquid crystal display device (LCD), a speaker etc.; a storage portion 908 including a hard disk and the like; and a communication portion 909 comprising a network interface card, such as a LAN card and a modem. The communication portion 909 performs communication processes via a network, such as the Internet. A driver 910 is also connected to the I/O interface 905 as required. A removable medium 911, such as a magnetic disk, an optical disk, a magneto-optical disk, and a semiconductor memory, may be installed on the driver 910, to facilitate the retrieval of a computer program from the removable medium 911, and the installation thereof on the storage portion 908 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 909, and/or may be installed from the removable media 911. The computer program, when executed by the CPU 901, implements the functions as defined by the methods of the present disclosure.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present disclosure may be implemented by way of software or hardware. The described units may also be provided in a processor, for example, described as: a processor, comprising an intercepting unit, a detection data constructing unit, a submitting unit, and a determining unit, where the names of these units or modules are not considered as a limitation to the units or modules. For example, the intercepting unit may also be described as "a unit for intercepting user data attempted by a current page to submit to a server".

In another aspect, the present disclosure further provides a non-transitory computer storage medium. The non-transitory computer storage medium may be the non-transitory computer storage medium included in the apparatus in the above embodiments, or a stand-alone non-transitory computer storage medium which has not been assembled into the apparatus. The non-transitory computer storage medium stores one or more programs. The one or more programs, when executed by one or more processors, cause the processors to implement the method for detecting a phishing page described in the present application.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for detecting a phishing page, comprising:
   intercepting user data attempted to be submitted by a current page to a server;

constructing detection data having a structure identical to a structure of the user data, content of the detection data being different from content of the user data;
submitting the detection data to the server; and
determining whether the current page is a phishing page based on a response from the server;
providing a user with a risk warning in response to determining the current page being a phishing page;
receiving a feedback on the risk warning from the user;
generating a phishing website database based on the feedback; and
determining whether the current page is a phishing website by using the phishing website database, before the intercepting user data attempted by the current page to submit to the server.

2. The method according to claim 1, wherein the determining whether the current page is a phishing page based on a response from the server comprises:
determining that the response from the server is a success in authenticating the detection data; and
determining that the current page is a phishing page.

3. The method according to claim 1, wherein the determining whether the current page is a phishing page based on a response from the server comprises:
determining that the response from the server is a failure in authenticating the detection data;
constructing second detection data having a structure identical to the structure of the user data but having content different from the content of the user data and the content of the detection data;
submitting the second detection data to the server; and
determining that the current page is a phishing page when the response from the server is a success in authenticating the second detection data.

4. The method according to claim 1, further comprising:
determining that the current page is a suspected phishing page; and
intercepting the user data attempted by the current page to submit to the server when determining that the current page is the suspected phishing page.

5. The method according to claim 4, wherein the determining that the current page is a suspected phishing page comprises:
determining that the user data attempted by the current page to submit to the server is a plaintext.

6. The method according to claim 4, wherein the determining that the current page is a suspected phishing page comprises:
determining a web address of an official website of the current page based on content of the current page; and
determining that the current page is a suspected phishing page when determining that a web address of the current page is inconsistent with the determined web address of the official website.

7. The method according to claim 1, wherein the user data comprise a username and a password.

8. The method according to claim 1, further comprising:
displaying the official website to a user based on the determining the current page being a phishing page.

9. A device, comprising:
a processor; and
a memory,
the memory storing computer-readable instructions executable by the processor, which when executed by the processor, cause the processor to perform operations, the operations comprising:
intercepting user data attempted to be submitted by a current page to a server;
constructing detection data having a structure identical to a structure of the user data, content of the detection data being different from content of the user data;
submitting the detection data to the server; and
determining whether the current page is a phishing page based on a response from the server,
providing a user with a risk warning in response to determining the current page being a phishing page;
receiving a feedback on the risk warning from the user;
generating a phishing website database based on the feedback; and
determining whether the current page is a phishing website by using the phishing website database, before the intercepting user data attempted by the current page to submit to the server.

10. A non-transitory computer storage medium, storing computer-readable instructions executable by a processor, the computer-readable instructions when executed by the processor, cause the processor to perform operations, the operation comprising:
intercepting user data attempted to be submitted by a current page to a server;
constructing detection data having a structure identical to a structure of the user data, content of the detection data being different from content of the user data;
submitting the detection data to the server; and
determining whether the current page is a phishing page based on a response from the server,
providing a user with a risk warning in response to determining the current page being a phishing page;
receiving a feedback on the risk warning from the user;
generating a phishing website database based on the feedback; and
determining whether the current page is a phishing website by using the phishing website database, before the intercepting user data attempted by the current page to submit to the server.

11. The device according to claim 9, wherein the determining whether the current page is a phishing page based on a response from the server comprises:
determining that the response from the server is a success in authenticating the detection data; and
determining that the current page is a phishing page.

12. The device according to claim 9, wherein the determining whether the current page is a phishing page based on a response from the server comprises:
determining that the response from the server is a failure in authenticating the detection data;
constructing second detection data having a structure identical to the structure of the user data but having content different from the content of the user data and the content of the detection data;
submitting the second detection data to the server; and
determining that the current page is a phishing page when the response from the server is a success in authenticating the second detection data.

13. The device according to claim 9, the operations further comprising:
determining that the current page is a suspected phishing page; and
intercepting the user data attempted by the current page to submit to the server when determining that the current page is the suspected phishing page.

14. The device according to claim 13, wherein the determining that the current page is a suspected phishing page comprises:
   determining that the user data attempted by the current page to submit to the server is a plaintext.

15. The device according to claim 13, wherein the determining that the current page is a suspected phishing page comprises:
   determining a web address of an official website of the current page based on content of the current page; and
   determining that the current page is a suspected phishing page when determining that a web address of the current page is inconsistent with the determined web address of the official website.

16. The device according to claim 9, wherein the user data comprise a username and a password.

17. The device according to claim 9, the operations further comprising:
   displaying the official website to a user based on the determining the current page being a phishing page.

* * * * *